United States Patent
Tanemura (10) Patent No.: US 10,162,413 B2
(45) Date of Patent: Dec. 25, 2018

(54) NON-CONTACT EYE GAZE TRACKING

(71) Applicant: Synaptics Incorporated, San Jose, CA (US)

(72) Inventor: Tetsuo Tanemura, Tokyo (JP)

(73) Assignee: SYNAPTICS INCORPORATED, San Jose, CA (US)

( * ) Notice: Subject to any disclaimer, the term of this patent is extended or adjusted under 35 U.S.C. 154(b) by 31 days.

(21) Appl. No.: 15/471,839

(22) Filed: Mar. 28, 2017

(65) Prior Publication Data

US 2018/0284883 A1    Oct. 4, 2018

(51) Int. Cl.
*G06F 3/044*    (2006.01)
*G06F 3/01*    (2006.01)

(52) U.S. Cl.
CPC ............ *G06F 3/013* (2013.01); *G06F 3/044* (2013.01); *G06F 2203/04108* (2013.01)

(58) Field of Classification Search
CPC ............ G06F 3/013; G06F 3/014; G06F 2203/04108; G06F 3/044
See application file for complete search history.

(56) References Cited

U.S. PATENT DOCUMENTS

| | | | |
|---|---|---|---|
| 2006/0208169 A1* | 9/2006 | Breed | B60N 2/002 250/221 |
| 2013/0127980 A1* | 5/2013 | Haddick | G06F 3/013 348/14.08 |
| 2013/0278631 A1* | 10/2013 | Border | G02B 27/017 345/633 |
| 2015/0015847 A1* | 1/2015 | Bergman | G06F 3/013 351/209 |
| 2016/0353988 A1 | 12/2016 | Moller et al. | |
| 2017/0139556 A1* | 5/2017 | Josephson | G06F 3/0482 |
| 2017/0227792 A1* | 8/2017 | Starner | A61B 5/14532 |
| 2017/0354326 A1* | 12/2017 | Pugh | A61B 3/113 |
| 2018/0173011 A1* | 6/2018 | Barrows | G02C 7/083 |

* cited by examiner

*Primary Examiner* — Ricardo L Osorio
(74) *Attorney, Agent, or Firm* — Paradice and Li LLP (57) ABSTRACT

A method and apparatus for determining an eye gaze direction of a user through one or more non-contact capacitive sensors. For at least some embodiments, a differential capacitance associated with a users' eye may be determined through at least one of the non-contact capacitive sensors. The differential capacitance may be based on capacitance measurements associated with the users' eye performed at different times. The eye gaze direction may be based, at least in part, on the determined differential capacitance. For some embodiments, two or more non-contact capacitive sensors may be positioned along an axis. Differential capacitance measurements from the two or more non-contact capacitive sensors may determine the eye gaze direction with respect to the axis.

17 Claims, 8 Drawing Sheets

NON-CONTACT EYE GAZE TRACKING

TECHNICAL FIELD

The present embodiments relate generally to eye gaze tracking, and more specifically to gaze tracking of eye movements via non-contact sensors.

BACKGROUND OF RELATED ART

Gaze tracking of a users' eye movement has had many widespread applications. For example, gaze tracking may be used to determine a users' input for operating a personal computer and/or directing applications running on a personal computer. In addition, gaze tracking may have application in computer games, aviation, industrial controls or the like.

Many techniques and systems for gaze tracking may be uncomfortable for the user and are often intrusive and/or expensive. For example, some gaze tracking devices use one or more cameras trained on the users' eyes to monitor and track eye movements. These cameras may be costly and furthermore may intrude into the users' workspace. Other gaze tracking devices may use one or more electrodes that require physical contact with the user. Such devices may be uncomfortable and/or distract from the users' experience.

Thus, there is a need for an improved gaze tracking device.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

An apparatus and method are disclosed for determining a users' eye gaze information through a non-contact sensor. An example method is disclosed and may include determining, by a first non-contact capacitance sensor, a first capacitance associated with a first eye at a first time, determining, by a second non-contact capacitance sensor, a second capacitance associated with the second eye at the first time, determining a first spatial differential capacitance between the first capacitance and the second capacitance, and determining eye gaze information based at least in part on the first spatial differential capacitance.

In another example, an input device is disclosed and may include a first non-contact capacitance sensor, a second non-contact capacitance sensor, a sensor interface circuit coupled to the first-non-contact capacitance sensor and the second non-contact capacitance sensor and configured to determine capacitance values based at least in part on signals from the first non-contact capacitance sensor and signals from the second non-contact capacitance sensor, and a controller coupled to the sensor interface circuit and configured to determine a first capacitance associated with a first eye at a first time, determine a second capacitance associated with the second eye at the first time, determine a first spatial differential capacitance between the first capacitance and the second capacitance, and determine eye gaze information based at least in part on the first spatial differential capacitance.

In still another example, an electronic system is disclosed and may include a display device and an input device including a first non-contact capacitance sensor, a second non-contact capacitance sensor, a sensor interface circuit coupled to the first-non-contact capacitance sensor and the second non-contact capacitance sensor and configured to determine capacitance values based at least in part on signals from the first non-contact capacitance sensor and signals from the second non-contact capacitance sensor, and a controller coupled to the sensor interface circuit and configured to determine a first capacitance associated with a first eye at a first time, determine a second capacitance associated with the second eye at the first time, determine a first spatial differential capacitance between the first capacitance and the second capacitance, and determine eye gaze information based at least in part on the first spatial differential capacitance.

In still another example, a non-transitory computer-readable storage medium storing instructions are disclosed that, when executed by one or more processors of a device, cause the device to determine, by a first non-contact capacitance sensor, a first capacitance associated with a first eye at a first time, determine, by a second non-contact capacitance sensor, a second capacitance associated with a second eye at the first time, determine a first spatial differential capacitance between the first capacitance and the second capacitance, and determine eye gaze information based at least in part on the first spatial differential capacitance.

BRIEF DESCRIPTION OF THE DRAWINGS

The example embodiments are illustrated by way of example and are not intended to be limited by the figures of the accompanying drawings. Like numbers reference like elements throughout the drawings and specification.

DETAILED DESCRIPTION

In the following description, numerous specific details are set forth such as examples of specific components, circuits, and processes to provide a thorough understanding of the disclosure. The term "coupled" as used herein means coupled directly to or coupled through one or more intervening components or circuits. In addition, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described below. The non-transitory computer-readable storage medium may form part of a computer program product, which may include packaging materials.

The non-transitory computer-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a computer-readable communication medium that carries or communicates code in the form of instructions or data structures and that may be accessed, read, and/or executed by a computer or other processor.

The various illustrative logical blocks, modules, circuits and instructions described in connection with the implementations disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. In addition, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices (such as a combination of a DSP and a microprocessor), a plurality of microprocessors, one or more microprocessors in conjunction with a DSP core, or any other suitable configuration.

Figure 1:
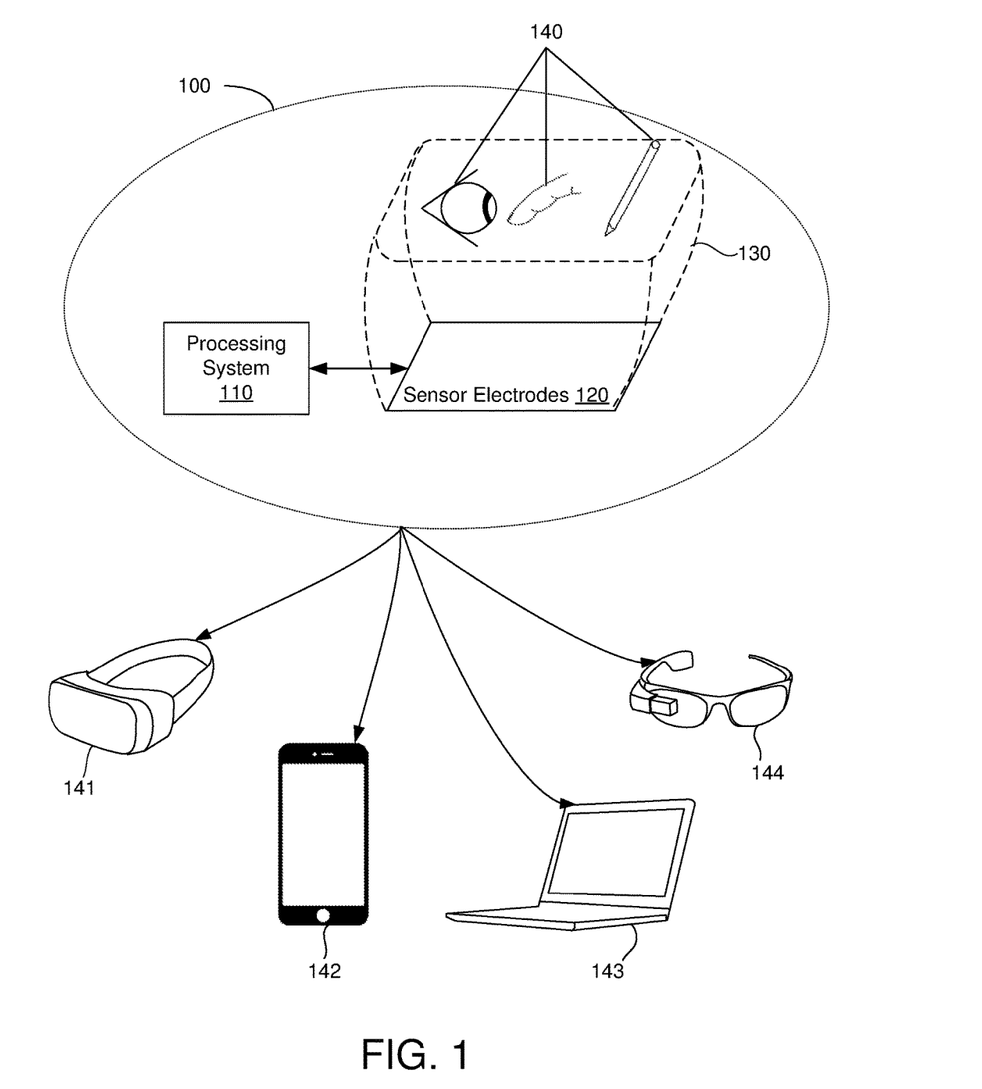
FIG. 1 is a simplified diagram of an input device, in accordance with some embodiments.

FIG. 1 is a simplified diagram of an input device 100, in accordance with some embodiments. The input device 100 (enclosed within the dotted circle) may include a processing system 110 and sensor electrodes 120. The input device 100 may be configured to provide an input for an electronic system. As used herein, the term "electronic system" (and/or "electronic device") may broadly refer to any system capable of electronically processing information. Some examples of electronic systems may include personal computers, such as desktop computers, netbook computers, tablets, web browsers, e-book readers, personal digital assistants (PDAs), and laptop computers. Further example electronic systems may include peripherals such as data input devices (including remote controls and mice), and data output devices (including display screens and printers) and combination input/output devices such as virtual reality (VR) goggles and smart glasses. Still further example electronic systems may include remote terminals, kiosks, and video game machines (e.g., video game consoles, portable gaming devices, and the like). Still other example electronic systems may include communication devices (including cellular phones, such as smart phones), and/or media devices (including recorders, editors, and players such as televisions, set-top boxes, music players, digital photo frames, digital cameras, and the like).

The input device 100 may be implemented as a physical part of the electronic system. Thus, by way of example and not limitation, the input device 100 may be included within electronic systems such as VR goggles 141, cellular phones 142, laptop computers 143, and/or smart glasses 144. In other embodiments, the electronic system within which the input device 100 is included may be an augmented reality (AR) or mixed reality (MR) headset. In other embodiments, the input device 100 may be physically separate from the electronic system. The electronic system may include a display device (not shown for simplicity) for displaying user data such as, for example, web pages, and/or rendered image data including virtual reality image data. As appropriate, the input device 100 may communicate with parts of the electronic system via any technically feasible bus, network, or wired/wireless communication connection.

In FIG. 1, the input device 100 is depicted as a proximity sensor input device. Thus, the sensor electrodes 120 may detect a proximity of one or more input objects 140 within a sensing region 130 (shown by dashed lines). In some embodiments, the sensor electrodes 120 may be non-contact sensors configured to determine proximity without physical contact with the input objects 140. Some example input objects 140 may include styli, fingers and/or other body parts including an eye as shown in FIG. 1.

The sensing region 130 may encompass any space above, around, in, and/or near the input device 100 through which the input device 100 is able to detect the input objects 140. The sizes, shapes, and locations of a particular sensing region 130 may vary from embodiment to embodiment. In some embodiments, the sensing region 130 may extend from a surface of the input device 100 (e.g., the sensor electrodes 120) in one or more directions into space until associated signal-to-noise ratios may prevent accurate object detection. The distance to which this sensing region 130 extends in a particular direction, in various embodiments, may be less than a millimeter, one or more millimeters, one or more centimeters, or any other technically feasible distance. The distance may vary based on sensing technology and/or a desired sensing accuracy. Thus, in some embodiments, the input device 100 may sense input objects 140 not in contact with the sensor electrodes 120. In various embodiments, input surfaces of the input device 100 may be provided by surfaces of casings (e.g., a case, a chassis or other physical structure) within which the sensor electrodes 120 may reside.

The sensor electrodes 120 may include any combination of sensor components and/or sensing technologies to detect the input objects 140 within the sensing region 130. For example, the sensor electrodes 120 may include capacitive, elastive, resistive, inductive, magnetic, acoustic, ultrasonic, and/or optical sensors.

In some inductive implementations, one or more of the sensor electrodes 120 may include sensing elements to detect loop currents induced by a resonating coil or coils. A combination of magnitude, phase, and/or frequency of the detected currents may determine a proximity and/or motion of the input objects 140.

In some capacitive implementations, a voltage and/or current may be applied to one or more electrodes included within the sensor electrodes 120 to create an electric field. Nearby input objects 140 may cause changes in the electric field, and thereby produce detectable changes in a capacitive coupling that may be detected as changes in voltage, current, or the like. The changes in voltage and/or current may determine the proximity and/or motion of the input objects 140. In some embodiments, the sensor electrodes 120 may include arrays of electrodes to create and/or detect the electric fields.

In some capacitive embodiments, the input device 100 may use "self capacitance" (also referred to as "absolute capacitance") sensing methods based on changes in the capacitive coupling between the sensor electrodes 120 and the input objects 140. In some embodiments, an input object 140 near the sensor electrodes 120 may alter the created electric field and thereby effect a measured capacitive coupling.

Some capacitive implementations may use "mutual capacitance" (also referred to as "transcapacitance") sensing methods based on changes in the capacitive coupling predominantly between sensor electrodes 120. In some embodiments, an input object 140 near the sensor electrodes 120 may alter an associated electric field, thereby changing a measured capacitive coupling. In at least one implementation, a transcapacitive sensing method may operate by detecting the capacitive coupling between one or more transmitter sensor electrodes (also "transmitter electrodes") and one or more receiver sensor electrodes (also "receiver electrodes"). The sensor electrodes 120 may include dedicated transmitter or receiver electrodes, and/or may include electrodes that may be configured to both transmit and receive.

The processing system 110 may be coupled to the sensor electrodes 120 and may be configured to operate hardware associated with the input device 100 to detect input objects 140 within the sensing region 130. The processing system 110 may include parts of or all of one or more integrated circuits (ICs) and/or other circuitry components (not shown for simplicity). For example, the processing system 110 may include transmitter circuitry configured to transmit signals with transmitter sensor electrodes, and/or receiver circuitry configured to receive signals with receiver sensor electrodes. In some embodiments, components of the processing system 110 may be located together, such as near the sensor electrodes 120. In other embodiments, components of processing system 110 may be physically separate from the sensor electrodes 120.

In some embodiments, the processing system 110 may respond to input objects 140 in the sensing region 130 by causing one or more input actions for the electronic system. Example actions may include changing operation modes, as well as GUI actions such as cursor movement, selection, menu navigation, and other functions. In some embodiments, the processing system 110 may provide information about the input objects 140 to some part of the electronic system (e.g. to a central processing system of the electronic system that is separate from the processing system 110, if such a separate central processing system exists).

In some embodiments, the processing system 110 may generate electrical signals based on the input objects 140 within the sensing region 130. The processing system 110 may process the electrical signals in producing the information provided to the electronic system. For example, the processing system 110 may digitize analog electrical signals obtained from the sensor electrodes 120. In another example, the processing system 110 may perform filtering and/or other signal conditioning of electrical signals.

In some embodiments, the input device 100 may include a touch screen interface, and the sensing region 130 may overlap at least part of an active area of a display screen. For example, the input device 100 may include substantially transparent sensor electrodes 120 overlaying the display screen and provide a touch screen interface for the associated electronic system. The display screen may be any type of dynamic display capable of displaying a visual interface to the user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may use some of the same electrical components for displaying and sensing. As another example, the display screen may be operated in part or in total by the processing system 110. In some other embodiments, the substantially transparent sensor electrodes 120 may be disposed on a display screen that, in turn, may be used in conjunction with a virtual reality headset, display, goggles, and/or glasses.

Figure 2A:
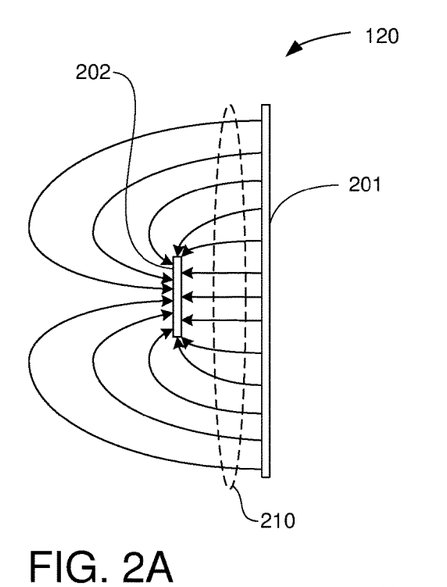
FIG. 2A depicts a portion of the sensor electrodes of FIG. 1 in the absence of an input object, in accordance with some embodiments.

FIG. 2A depicts a portion of the sensor electrodes 120 of FIG. 1 in the absence of the input objects 140, in accordance with some embodiments. The sensor electrodes 120 may be non-contact capacitive sensors and may include a first electrode 201 and a second electrode 202. For simplicity, FIG. 2A does not show various components which may be included with the input device 100 and coupled to the sensor electrodes 120. For example, amplifiers, voltage sources, signal conditioning circuits may be omitted for clarity. Although only two electrodes (first electrode 201 and second electrode 202) are shown, in other embodiments the sensor electrodes 120 may include any technically feasible number of electrodes.

In one embodiment, the first electrode 201 and the second electrode 202 may be arranged on different sides of a substrate (substrate not shown for simplicity). For example, the first electrode 201 may be disposed on a first substrate side and the second electrode 202 may be disposed on a second substrate side. In another example, the first electrode 201 and the second electrode 202 may be arranged on separate substrates. In another embodiment, the first electrode 201 and the second electrode 202 may be located on the same side or surface of a common substrate.

In any of the sensor electrode arrangements discussed above, the sensor electrodes 120 may be formed on a substrate that is external to or internal to a display device (not shown for simplicity). For example, the sensor electrodes 120 may be disposed on the outer surface of a lens of the input device 100. In other embodiments, the sensor electrodes 120 may be disposed between a color filter glass of the display device and the lens of the input device. In still other embodiments, at least a portion of the sensor electrodes 120 may be disposed such that they are between a Thin Film Transistor substrate (TFT substrate) and the color filter glass of the display device. In some embodiments, a first plurality of sensor electrodes may be disposed between the TFT substrate and color filter glass of the display device while a second plurality of sensor electrodes may be disposed between the color filter glass and the lens of the input device 100. In yet other embodiments, all of the sensor electrodes 120 may be disposed between the TFT substrate and color filter glass of the display device.

As shown, electric field lines 210 may originate from the first (transmitting) electrode 201 and terminate at the second (receiving) electrode 202. A first capacitance value may be determined based on the electric field lines 210. In other words, the first capacitance value may be determined based on the capacitive coupling between the first electrode 201 and the second electrode 202. In some embodiments, the electric field lines 210 may occupy the sensing region 130 of FIG. 1. The shape, operation, and/or relative positions of the first electrode 201 and the second electrode 202 of FIG. 2A are illustrative and are not meant to be limiting. For example, the first electrode 201 and the second electrode 202 may be any technically feasible shape and/or in any technically feasible relative position. In addition, in some embodiments, the second electrode 202 may be the transmitting electrode and the first electrode 201 may be the receiving electrode. In still other embodiments, the first electrode 201 and/or the second electrode 202 may both transmit and receive simultaneously or transmitting/receiving operations may alternate between two or more electrodes.

Figure 2B:
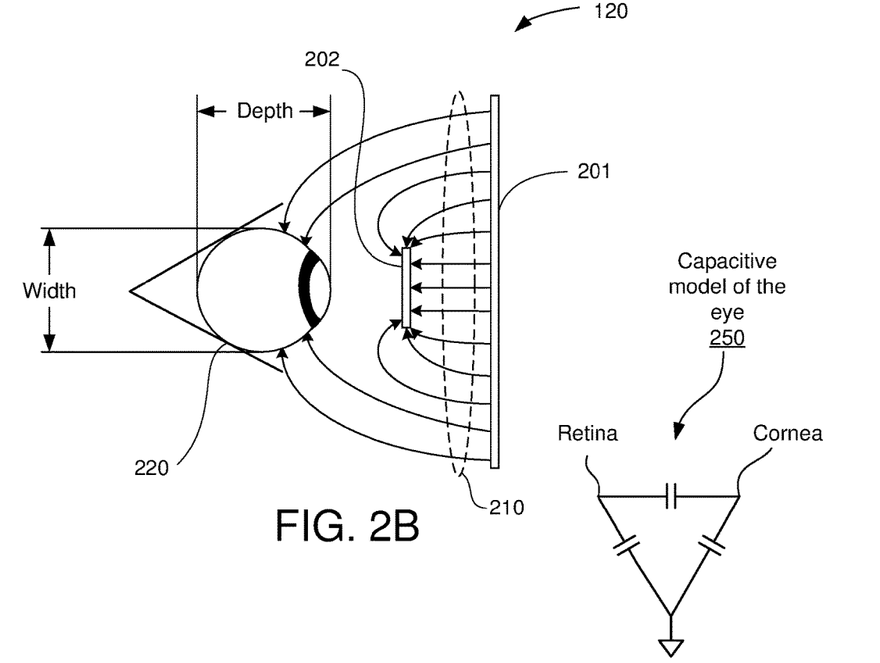
FIG. 2B depicts a portion of the sensor electrodes of FIG. 1 in the presence of an eye, in accordance with some embodiments.

FIG. 2B depicts a portion of the sensor electrodes 120 of FIG. 1 in the presence of an eye 220, in accordance with some embodiments. In other embodiments, the eye 220 may be replaced with any technically feasible input object 140. As shown, the electric field lines 210 may be affected by the presence of the eye 220. Note that physical contact with either the first electrode 201 or the second electrode 202 by the eye 220 is not required since electric fields lines 210 are not restricted to the first electrode 201 and the second electrode 202, but instead occupy a space proximate to the first electrode 201 and the second electrode 202. In contrast to the electric field lines 210 shown in FIG. 2A, the electric field lines 210 may no longer terminate solely on the second electrode 202, but also on the eye 220. In other words, the sensor electrodes 120 may be non-contact sensors and may not require any ohmic contact with any portion of the eye 220 or any other input object 140.

A second capacitance value may be determined based on the electric field lines 210 in the presence of the eye 220. Since the capacitive coupling between the first electrode 201 and the second electrode 202 (or the capacitive coupling between any one electrode and its surroundings in the case of absolute capacitance sensing) is affected by the eye 220, the related capacitance value may also change from the first capacitance value. In some aspects, the capacitance associated with the eye 220 (or any other feasible input object 140) may directly or indirectly affect the capacitance value.

A difference between the first capacitance value and the second capacitance value may indicate the presence of the eye 220 within the sensing region 130. Moreover, in some embodiments, changes between determined capacitance values may also indicate a change to the position of the eye 220.

Human eyes are not spherical, but instead may have a depth greater than a width. In some aspects, a capacitive model 250 of the eye 220 may include a relationship between a corneal capacitance and a retinal capacitance. In one example, $C_{EYE}$ (eye capacitance)=$C_{CORNEA}$ (cornea capacitance)−$C_{RETINA}$ (retina capacitance). Thus, $C_{EYE}$ may be relatively fixed based on physical characteristics of the eye 220. However, as the eye 220 moves, a fixed or relatively fixed sensor may detect a change in the eye capacitance $C_{EYE}$ based on a distance between the cornea and the sensor and a distance between the retina and the sensor. The changing eye capacitance $C_{EYE}$ may affect the electric field lines 210 which may, in turn, affect determined capacitance values. Thus, changing capacitance values may indicate eye movement. In this way, eye movement may be detected by the sensor electrodes 120 of the input device 100 without any direct contact by the eye 220 with either the first electrode 201 and/or the second electrode 202.

In some aspects, a distance between the eye 220 and the first electrode 201 and/or second electrode 202 may affect the determined capacitance value. For example, the electric field lines 210 strength may be inversely proportional to a distance from either the first electrode 201 and/or the second electrode 202. Thus, changes in capacitance values might only be detected when the eye 220 (or any other input object 140) is within an effective distance from either the first electrode 201 and/or the second electrode 202. In some embodiments, when the eye 220 is further than the effective distance, then no change in capacitance values are determined by the first electrode 201 and/or the second electrode 202.

Figure 3:
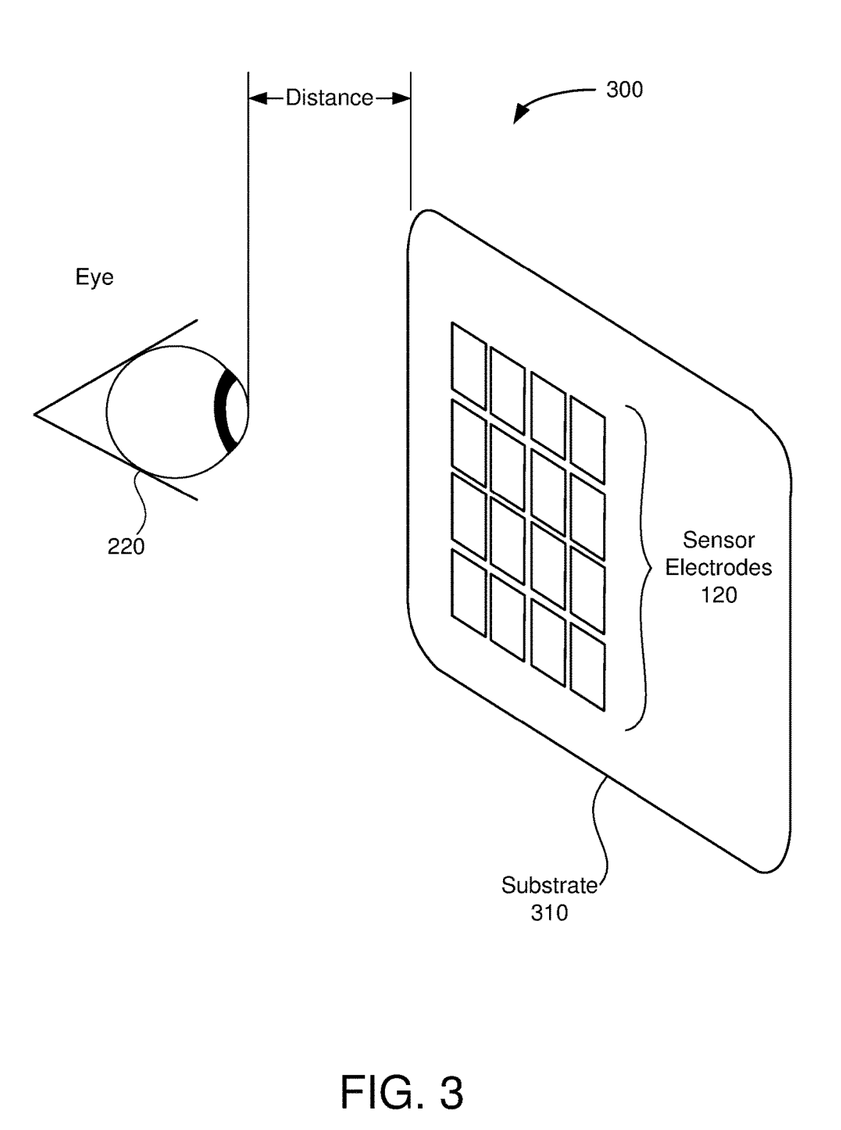
FIG. 3 depicts a non-contact eye gaze tracking device, in accordance with some embodiments.

FIG. 3 depicts a non-contact eye gaze tracking device 300, in accordance with some embodiments. The eye gaze tracking device 300 may include a plurality of sensor electrodes 120 disposed on, within, and/or behind a substrate 310. The sensor electrodes 120 may be configured to detect the capacitance of input objects 140 (such as the eye 220) within an effective distance. Although not shown for simplicity, the sensor electrodes 120 may include a plurality of electrodes 201 and 202 (such as those illustrated with respect to FIGS. 2A and 2B) to transmit and/or receive electric fields. Capacitive values may be determined based on the electric fields associated with the sensor electrodes 120.

In some aspects, multiple electrodes within the sensor electrodes 120 may be arranged in a regular and/or irregular pattern. In addition, the sensor electrodes 120 may be arranged along one or more axes. For example, the sensor electrodes 120 may be arranged along two or more axes to determine eye movement (gaze) with respect to the two or more axes. In some embodiments, the two or more axes may be orthogonal to each other. The number of electrodes within the sensor electrodes 120 and the arrangement thereof may vary. In some embodiments, the number and arrangement of sensor electrodes 120 may be determined at least in part by one or more physical aspects of the input device 100. For example, a size, shape, and/or arrangement of the substrate 310 may determine, at least in part, the number and/or arrangement of the sensor electrodes 120.

In some embodiments, differential capacitance measurements between different electrodes and/or similar electrodes at different times may determine eye gaze. The changes in capacitance captured by the differential capacitance measurements, may determine different eye movements (gaze). Eye gaze tracking is described in more detail in conjunction with FIGS. 4 and 5 below.

Figure 4:
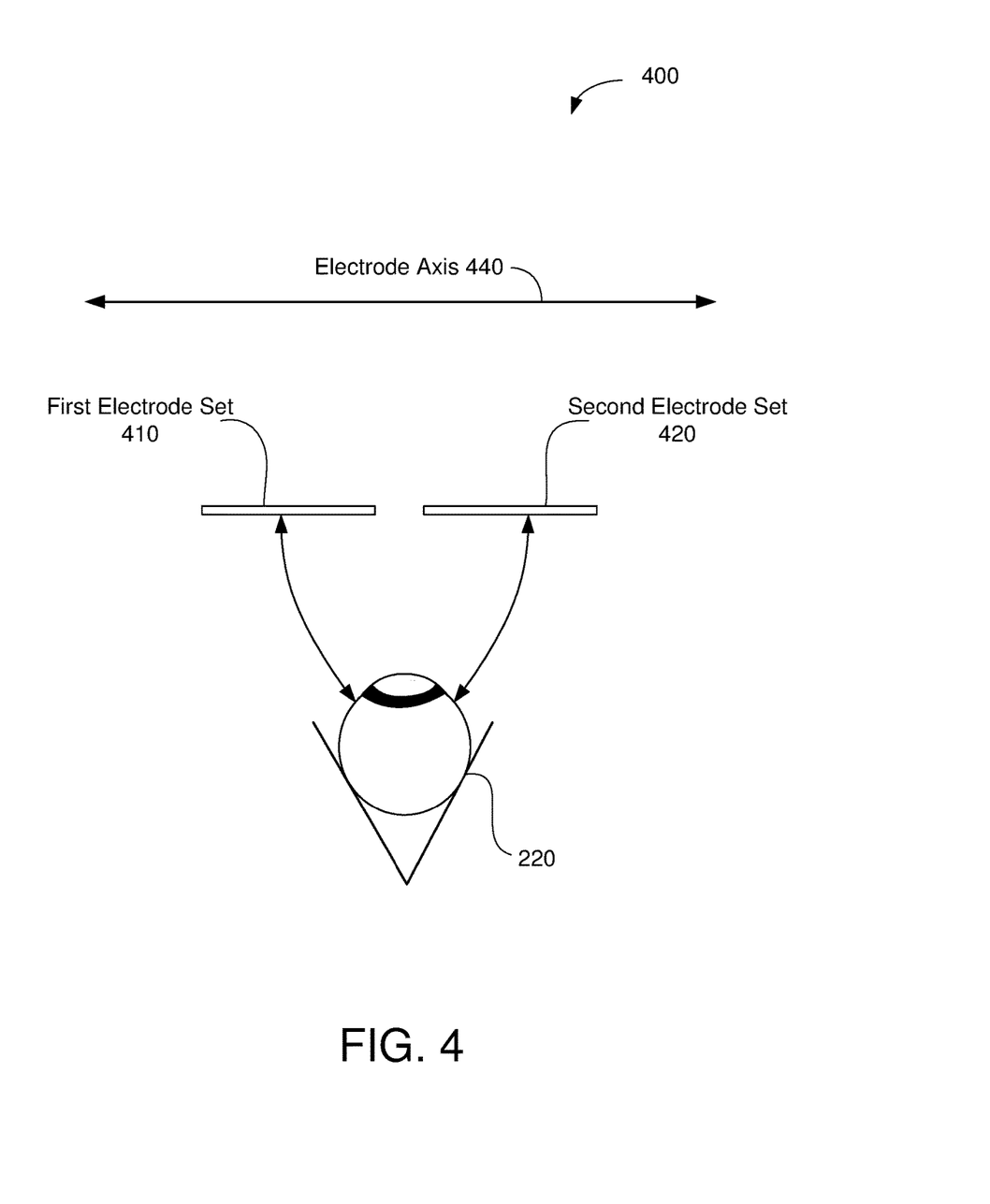
FIG. 4 is a simplified diagram depicting an eye within an effective distance of a first electrode set and a second electrode set.

FIG. 4 is a simplified diagram 400 depicting the eye 220 of FIG. 2 within an effective distance of a first electrode set 410 and a second electrode set 420. The first electrode set 410 and the second electrode set 420 may include two or more non-contact electrodes similar to those described above with respect to FIGS. 2A and 2B. (Thus, each electrode set may include two or more individual electrodes to determine a capacitance associated with the eye 220 without any ohmic contact with the user.) The first electrode set 410 and the second electrode set 420 may be arranged with respect to an axis 440. For example, in a first embodiment, the axis 440 may be relatively horizontal with respect to the user. Thus, the first electrode set 410 may be positioned to the left or right of the second electrode set 420. In this orientation, differential capacitance measurements (e.g., a spatial differential capacitance) between the first electrode set 410 and the second electrode set 420 may indicate horizontal eye movement. In a second embodiment, the axis 440 may be relatively vertical with respect to the user. Thus, the first electrode set 410 may be positioned above or below the second electrode set 420. In this orientation, spatial differential capacitance measurements between the first electrode set 410 and the second electrode set 420 may indicate vertical eye movement.

For example, the capacitance associated with the first electrode set 410 at a time t (e.g., a temporal capacitance) may be expressed by $C1(t)$. The temporal capacitance associated with the second electrode set 420 at time t may be expressed by $C2(t)$. The temporal capacitance may be based on the capacitive coupling between the eye 220 and the first electrode set 410 and/or the second electrode set 420 at a determined time. A spatial differential capacitance between the capacitance of the first electrode set 410 and the second electrode set 420 (e.g., $dCs_{12}(t)$) may be expressed by equation 1, shown below:

$$dCs_{12}(t)=C1(t)-C2(t) \qquad \text{eq. 1}$$

In equation 1, the term "spatial" may refer to capacitive values based on one or more spatial positioning aspects of the electrode sets.

In addition, a temporal differential capacitance dC1 associated with the first electrode set 410 may be based on a capacitance at time=t and an earlier capacitance at time=(t−1). This temporal differential capacitance (e.g., dC1) may be expressed by equation 2, shown below:

$$dC1=C1(t)-C1(t-1) \qquad \text{eq. 2}$$

In a similar manner, a temporal differential capacitance associated with the second electrode set 420 (e.g., dC2) may be expressed by equation 3, shown below:

$$dC2=C2(t)-C2(t-1) \qquad \text{eq. 3}$$

The spatial and temporal differential capacitance values expressed in equations 1-3 above may be used alone or in combination to determine eye gaze information. In a first example, if $dCs_{12}(t)$ is greater than an upper spatial threshold, and if dC1 is greater than a second threshold (e.g., a positive value) and dC2 is less than a third threshold (e.g., a negative value), then eye gaze may be inferred to be in the direction of the first electrode set 410. If the axis 440 is oriented horizontally with respect to the user and the first electrode set 410 is positioned to the left of the second electrode set 420, then the eye gaze may be inferred to be directed to the left. On the other hand, if the first electrode set 410 is positioned to the right of the second electrode set 420, then the eye gaze may be determined to be directed to the right. In another example, if the $dCs_{12}(t)$ is less than a lower spatial threshold, and if dC1 is less than the second threshold (e.g., a negative value) and dC2 is greater than the third threshold (e.g., a positive value), then eye gaze may be determined to be in the direction of the second electrode set 420. Therefore, if the axis 440 is oriented horizontally and the first electrode set 410 is positioned to the left of the second electrode set 420, then the eye gaze direction may be determined to be directed to the right. On the other hand, if the first electrode set 410 is positioned to the right of the second electrode set 420, then the eye gaze may be determined to be directed to the left. In some embodiments, if $dCs_{12}(t)$ is between the upper spatial threshold and the lower spatial threshold, then there may be no change in eye gaze direction.

In other embodiments, the axis 440 may be oriented substantially vertically with respect to the user and the first electrode set 410 may be positioned above or below the second electrode set 420. Therefore, based on $dCs_{12}(t)$, dC1, and/or dC2 values, the eye gaze direction may be determined to be directed up or down (e.g., in the direction of the first electrode set 410 or in the direction of the second electrode set 420). Although only two axes (horizontal and vertical) are described here, eye gaze in any number of axes may be determined either through additional electrode sets arranged on additional axes, or through mathematical processing of differential and/or instantaneous capacitance values associated with two or more electrode sets.

As described above, the spatial differential capacitance and temporal differential capacitance is determined with respect to a single eye. Those skilled in the art will appreciate that the spatial differential and temporal differential capacitance determination is extensible to two eyes. For example, temporal differential capacitance values may be determined for two eyes using the electrode sets described above, or additional electrode sets. The temporal differential capacitance values associated with both eyes may be used in combination to determine the eye gaze direction. For example, the eye gaze direction may be based on a maximum, minimum, and/or average temporal differential capacitance value associated with the first and the second eyes. In addition, boolean comparisons of the spatial differential capacitance (compared to a threshold) and temporal differential capacitance (compared to other temporal differential capacitance values) may be used to determine eye gaze information. In some aspects, the spatial and temporal capacitance information for two eyes may be used to determine eye gaze direction because a users' two eyes typically move together to point or gaze in a similar direction.

The determined eye gaze direction may be used as a user input for the electronic system described above with respect to FIG. 1. For example, the eye gaze direction may be used to guide a cursor and/or select one or more elements presented on the display device. In another example, the eye gaze direction may be used to direct display content for virtual reality googles and/or smart glasses.

Figure 5A:
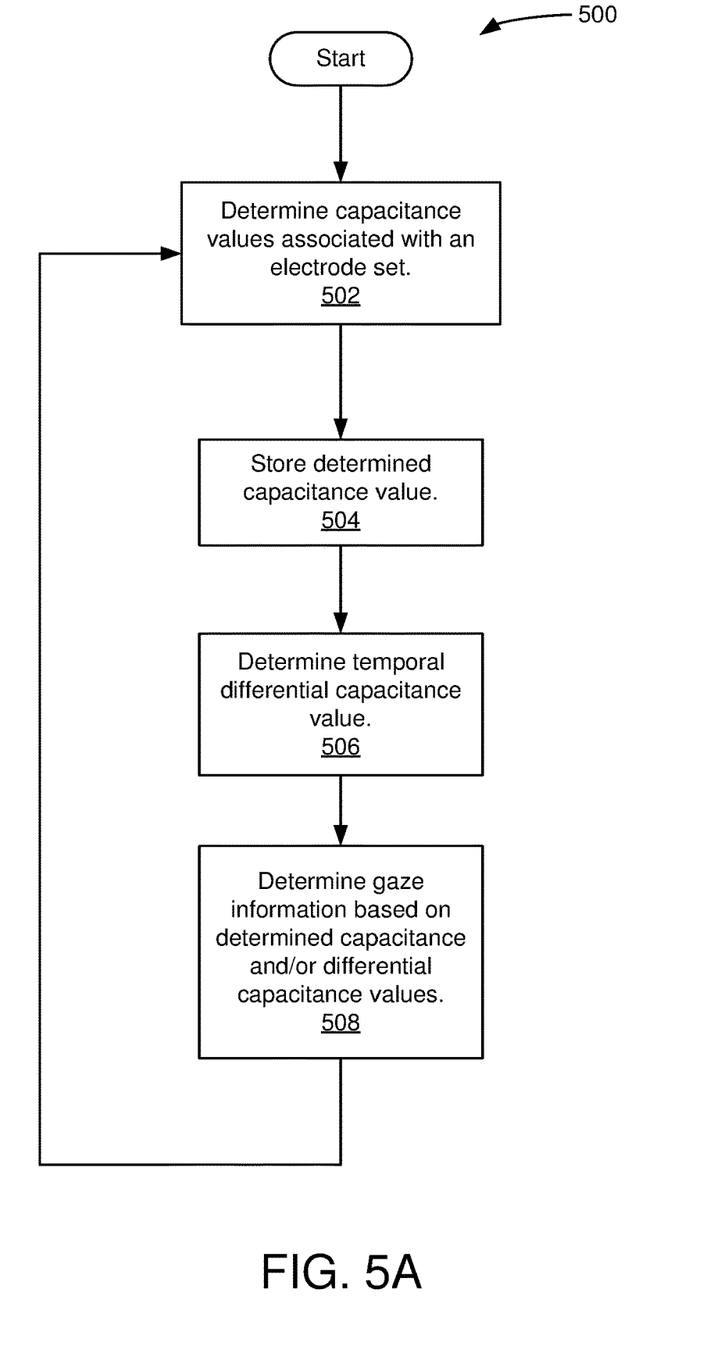
FIG. 5A is an illustrative flow chart depicting an example operation for determining eye gaze, in accordance with some embodiments.

FIG. 5A is an illustrative flow chart depicting an example operation 500 for determining eye gaze information, in accordance with some embodiments. By way of example, and for ease of explanation, the operation 500 may be performed by the processing system 110. In other embodiments, the operation 500 may be performed by a processor associated with an electronic system and/or device, a state machine or any other technically feasible device. Some embodiments may perform the operations described herein with additional operations, fewer operations, operations in a different order, operations in parallel, and/or some operations differently. To ease the explanation of the operations depicted in FIG. 5A, some elements from FIGS. 1-4, although not illustrated in FIG. 5A, are described herein with the corresponding reference numbers from FIGS. 1-4.

The operation begins as the processing system 110 determines capacitance values associated with an electrode set (502). In some embodiments, the electrode set may be the first electrode set 410 or the second electrode set 420 of FIG. 4. An electric field may be generated and detected by the electrode set. Capacitance values for the electrode set may be determined based on the detected electric fields. For example, electric field lines may be transmitted by a first electrode of the electrode set and received by a second electrode of the electrode set. In some embodiments the first and the second electrodes may both be transmitting and receiving electric field lines.

Next, the processing system 110 stores the determined capacitance values (504). In some aspects, the capacitance values may be stored in a volatile or non-volatile memory included within or coupled to the processing system 110. Next, the processing system 110 determines temporal differential capacitance values (506). The temporal differential capacitance values may be determined with respect to the electrode set as described above in equations 2 and/or 3. In some embodiments, the temporal differential capacitance values may be determined from two or more capacitance values stored in memory (such as the determined capacitance values stored in 504).

Next, the processing system 110 may determine eye gaze information based on the determined and/or the temporal differential capacitance values (508). In some embodiments, the determined capacitance value (determined at 502) may be compared to a threshold level. For example, a first threshold may be associated with a first eye position (e.g., straight ahead). If the determined capacitance value exceeds the first threshold, then the eye gaze may be determined to be in the first eye position. In some embodiments, a plurality of thresholds may be associated with a plurality of eye gaze positions. In still other embodiments, the temporal differential capacitance values (determined at 506) may be compared to a second (and possibly different) threshold. In some aspects, if the determined temporal differential capacitance value (as determined by equation 2 or 3, for example) exceeds the second threshold, then the eye gaze position may be determined to be moving (or changing). On the other hand, if the determined temporal differential capacitance value is less than the second threshold, then the eye gaze position may be determined to be stationary, or moving a small amount. Operations then return to 502.

Figure 5B:
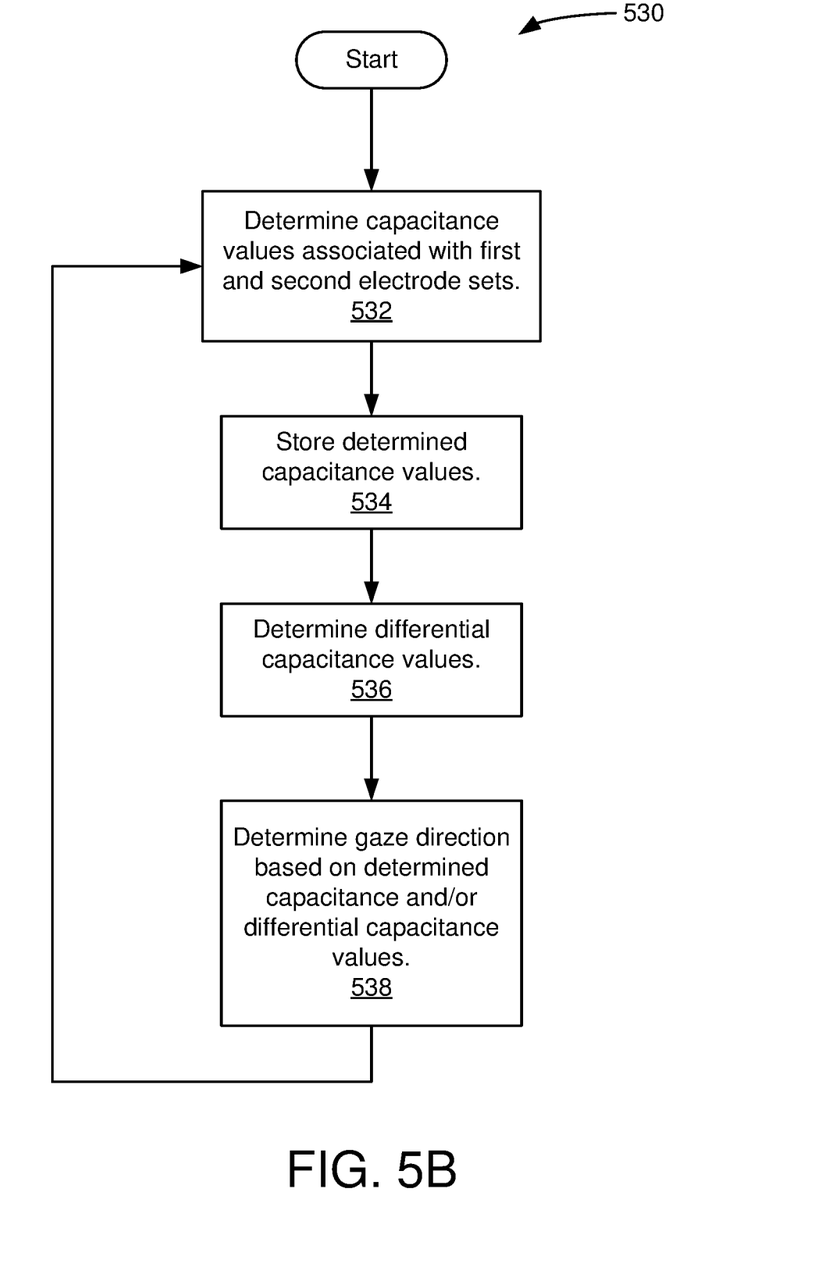
FIG. 5B is an illustrative flow chart depicting an example operation for determining eye gaze, in accordance with some embodiments.

FIG. 5B is an illustrative flow chart depicting another example operation 530 for determining eye gaze information, in accordance with some embodiments. The operation 530 begins as the processing system 110 determines capacitance values associated with a first and a second set of electrodes (532). In some embodiments, the electrode sets may be the first electrode set 410 and the second electrode set 420 of FIG. 4. An electric field may be generated and detected by each electrode set. Capacitance values for each electrode set may be determined based on the detected electric fields. In some aspects, at least two capacitance values may be determined at a time t for the first and the second electrode sets 410 and 420 (e.g., C1(t) and C2(t) as described above with respect to FIG. 4).

Next, the processing system 110 stores the determined capacitance values (534). In some aspects, the capacitance values C1(t) and C2(t) may be stored in a volatile or non-volatile memory included within or coupled to the processing system 110. Next, the processing system 110 determines differential capacitance values (536). Temporal differential capacitance values and/or spatial differential capacitance values may be determined with respect to the first and second electrode sets as described above in equations 1-3. In some embodiments, the spatial and/or temporal differential capacitance values may be determined from two or more capacitance values determined at two or more different times and stored in memory (such as the determined capacitance values stored in 534). For example, a temporal differential capacitance value may be determined with respect to one eye 220 and the first electrode set at two different times. In another example, a temporal differential capacitance value may be determined with respect to one eye 220 and the second electrode set at two different times. In yet another example, a spatial differential capacitance value may be determined with respect to one eye 220 and the first and the second electrode sets. Those skilled in the art will appreciate that other temporal and/or spatial differential capacitance values may be determined with any technically feasible number of input objects 140 of FIG. 1 (e.g., eyes 220) and any technically feasible number of sensor electrodes.

Next, the processing system 110 may determine eye gaze information based on the determined and/or the differential temporal and/or spatial capacitance values (538). In some embodiments, the determined capacitance values (determined at 532) may be compared to a threshold. For example, a third threshold may be associated with a first eye position or orientation (e.g., straight ahead). If the determined capacitance value exceeds the third threshold, then the eye gaze may be determined to be in the first eye gaze position or orientation. In other embodiments, a plurality of thresholds may be associated with a plurality of eye gaze positions.

In some aspects, the spatial differential capacitance between electrode sets (determined at 536 and expressed by equation 1, for example) may be compared to a fourth threshold. If the spatial differential capacitance is less than the fourth threshold, then the eye gaze may be steady and/or moving relatively small amounts. On the other hand, if the spatial differential capacitance is greater than the fourth threshold, then the eye gaze may be changing. In other aspects, no change in eye gaze may be detected until the temporal differential capacitance levels determined by equation 2 and/or equation 3 both exceed one or more threshold levels. If two or more electrode sets are arranged along an axis, then the eye gaze may be determined with respect to the electrode axis as described above with respect to FIG. 4. Operations then return to 532.

Table 1 (see below) illustrates example eye gaze determination based on differential capacitance values.

TABLE 1

| $dCS_{12}$ (spatial differential capacitance between $1^{st}$ and $2^{nd}$ sensors) | dC1 (temporal differential capacitance for $1^{st}$ sensor set) | dC2 (temporal differential capacitance for $2^{nd}$ sensor set) | Eye Gaze |
|---|---|---|---|
| Greater than an upper spatial threshold | Greater than second threshold | Less than third threshold | Toward $1^{st}$ sensor set |
| Greater than a lower spatial threshold | Less than second threshold | Greater than third threshold | Toward $2^{nd}$ sensor set |
| Between the upper and lower thresholds | n/a | n/a | No change in eye gaze |

Figure 6:
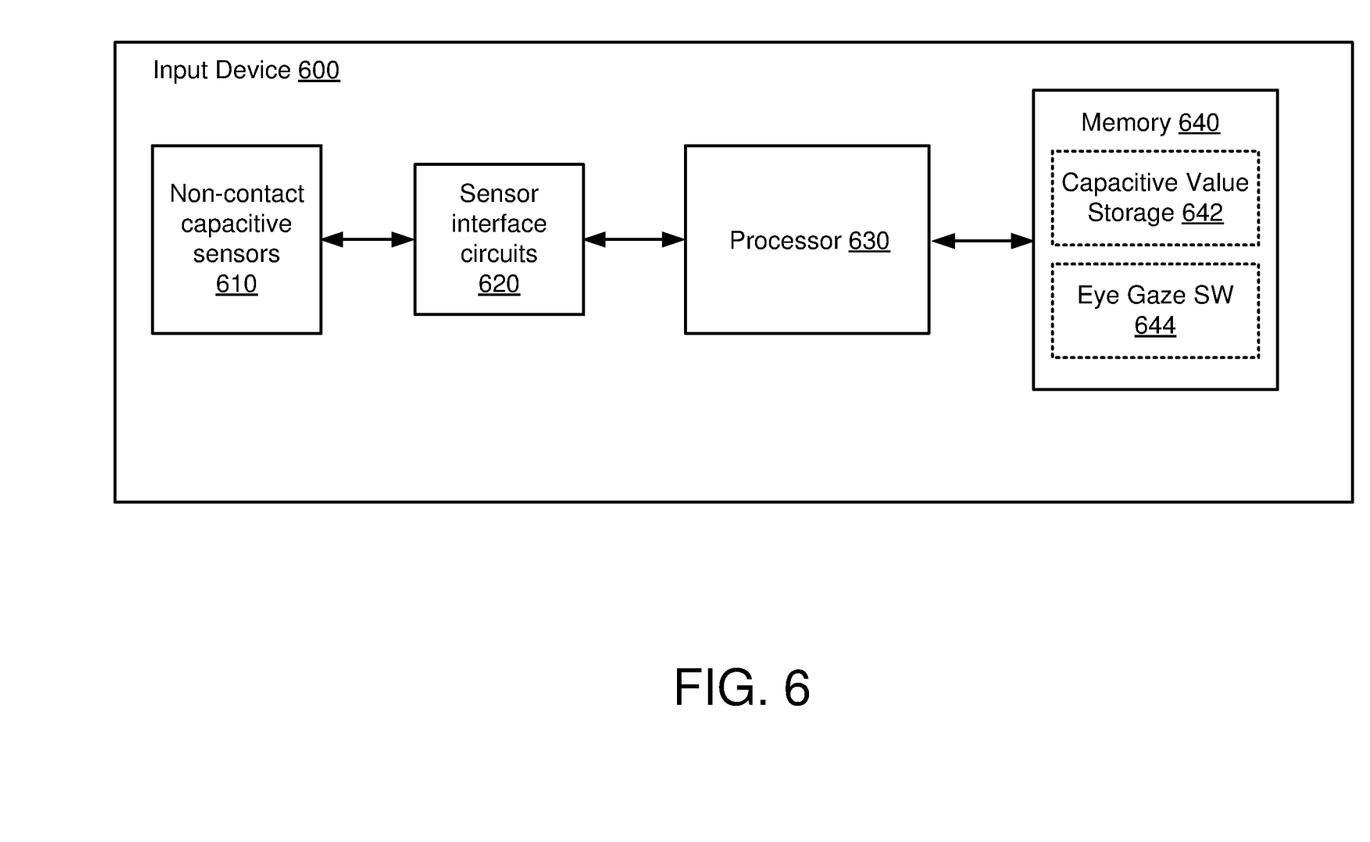
FIG. 6 shows a block diagram of an embodiment an input device.

FIG. 6 shows a block diagram of an embodiment of an input device 600. In some aspects, the input device 600 may be an embodiment of the input device 100 of FIG. 1. The input device 600 may include non-contact capacitive sensors 610, sensor interface circuits 620, a processor 630, and a memory 640. The non-contact capacitive sensors 610 may be an embodiment of the sensor electrodes 120 of FIGS. 1 and 3, the first and second electrodes 201 and 202 of FIG. 2, and/or the first and second electrode sets 410 and 420 of FIG. 4.

The processor 630 may be coupled to the non-contact capacitive sensors 610 through the sensor interface circuits 620. The non-contact capacitive sensors 610 may determine associated capacitance values (including differential capacitance values). The sensor interface circuits 620 may include one or more signal processing devices (signal amplifiers, filters, buffers, analog-to-digital converters and the like) to determine capacitance values based on one or more electric fields generated and received by the non-contact capacitive sensors 610. In some aspects, the processor 630 may be an embodiment of the processing system 110 of FIG. 1. For example, the processor 630 may be any one or more suitable processors capable of executing scripts or instructions of one or more software programs stored in the input device 600 (such as within the memory 640).

The memory 640 may include a capacitive value storage array 642 that may store capacitive values determined by the non-contact capacitive sensors 610, the sensor interface circuits 620, and the processor 630. In some embodiments, the capacitive value storage array 642 may store differential capacitive values determined in accordance with equations 1-3 described above.

Further, the memory 640 may also include a non-transitory computer-readable storage medium (e.g., one or more nonvolatile memory elements, such as EPROM, EEPROM, Flash memory, a hard drive, etc.) that may store an eye gaze software (SW) module 644 to determine eye gaze.

The eye gaze SW module 644 may include program instructions that, when executed by the processor 630, may cause the input device 600 to perform the corresponding function(s). Thus, the non-transitory computer-readable storage medium of memory 640 may include instructions for performing all or a portion of the operations of FIG. 5.

Processor 630 may execute the eye gaze SW module 644 to direct the sensor interface circuits 620 to determine capacitance values in conjunction with the non-contact capacitive sensors 610. Executing the eye gaze SW module 644 may also determine differential capacitance values such as those described in equations 1-3 above. In some embodiments, executing the eye gaze SW module 644 may determine eye gaze direction such as described above in Table 1. The eye gaze direction may be used as a user input for an electronic device and/or system.

Figure 7:
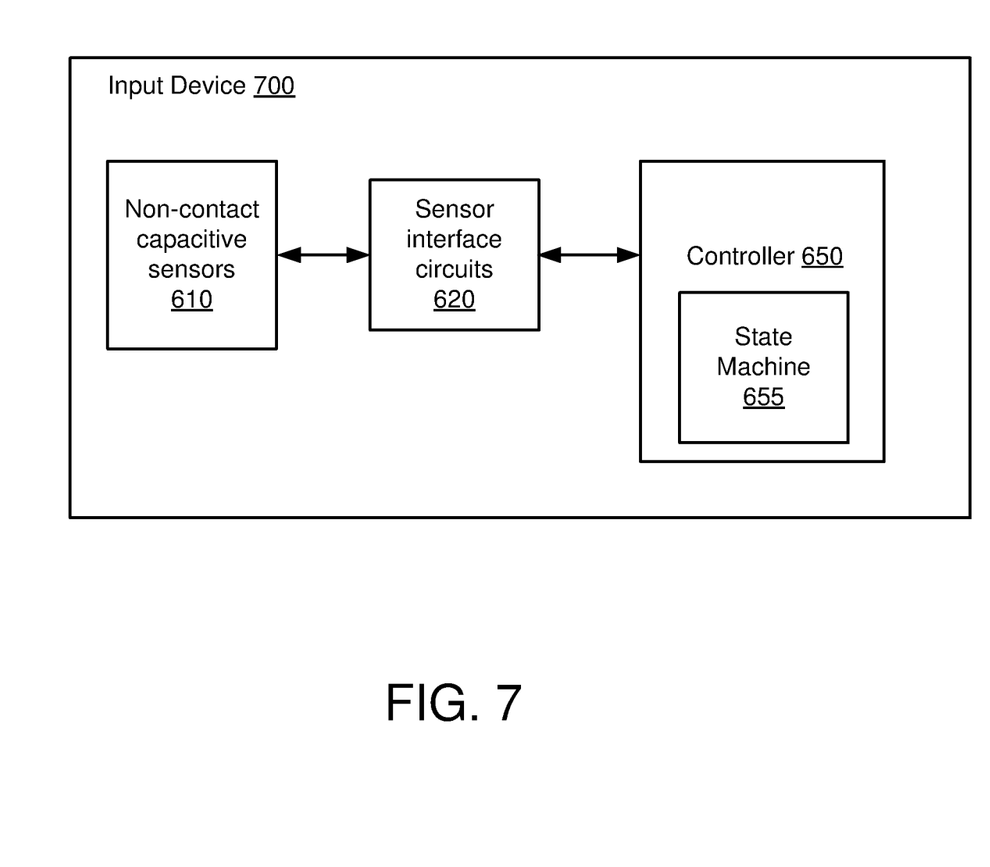
FIG. 7 shows a block diagram of another embodiment an input device.

FIG. 7 shows a block diagram of another embodiment of an input device 700. In some aspects, the input device 700 may be another embodiment of the input device 100 of FIG. 1. Similar to the input device 600 of FIG. 6, the input device 700 may include non-contact capacitive sensors 610 and the sensor interface circuit 620. The input device 700 may also include a controller 650. In some aspects, the controller 650 may operate similar to the processor 630 and/or memory 640 of FIG. 6. For example, the controller 650 may include circuitry such as a state machine 655. The state machine 655 may be configured to perform all or a portion of the operation 500 of FIG. 5.

In the foregoing specification, the example embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for determining eye gaze information, comprising:
   determining, by a first non-contact capacitance sensor, a first capacitance associated with a first eye at a first time;
   determining, by a second non-contact capacitance sensor, a second capacitance associated with a second eye at the first time;
   determining a first spatial differential capacitance between the first capacitance and the second capacitance;
   determining, by the first non-contact capacitance sensor, a third capacitance associated with the first eye at a second time;
   determining a first temporal differential capacitance between the first capacitance and the third capacitance;
   determining, by the second non-contact capacitance sensor, a fourth capacitance associated with the second eye at the second time; and
   determining a second temporal differential capacitance between the second capacitance and the fourth capacitance, and
   determining eye gaze information based at least in part on the first spatial differential capacitance, the first temporal differential capacitance, and the second temporal differential capacitance.

2. The method of claim 1, wherein the eye gaze information is determined if the first spatial differential capacitance is greater than a first threshold.

3. The method of claim 1, wherein the eye gaze information indicates an eye gaze direction along an axis determined by a position of the first non-contact capacitance sensor and the second non-contact capacitance sensor.

4. The method of claim 1, further comprising:
   comparing the first temporal differential capacitance to a second threshold; and
   comparing the second temporal differential capacitance to a third threshold,
   wherein the eye gaze information indicates an eye gaze toward the first non-contact capacitance sensor if the first temporal differential capacitance is greater than the second threshold and the second temporal differential capacitance is less than the third threshold.

5. The method of claim 4, wherein the eye gaze information indicates an eye gaze toward the second non-contact capacitance sensor if the first temporal differential capacitance is less than the second threshold and the second temporal differential capacitance is greater than the third threshold.

6. The method of claim 1, further comprising:
   determining a second spatial differential capacitance between the third capacitance and the fourth capacitance, and
   determining at least one from the group consisting of:
      a maximum capacitance between the first spatial differential capacitance and the second spatial differential capacitance,
      a minimum capacitance between the first spatial differential capacitance and the second spatial differential capacitance; and an average capacitance between the first spatial differential capacitance and the second spatial differential capacitance, wherein the eye gaze information is based at least in part on at least one from the group consisting of the maximum, minimum, and average capacitance.

7. An input device comprising:
a first non-contact capacitance sensor;
a second non-contact capacitance sensor;
a sensor interface circuit coupled to the first non-contact capacitance sensor and the second non-contact capacitance sensor and configured to determine capacitance values based at least in part on signals from the first non-contact capacitance sensor and the second non-contact capacitance sensor; and
a controller coupled to the sensor interface circuit and configured to:
determine a first capacitance associated with a first eye and the first non-contact capacitance sensor at a first time;
determine a second capacitance associated with a second eye and the second non-contact capacitance sensor at the first time;
determine a first spatial differential capacitance between the first capacitance and the second capacitance;
determine a third capacitance associated with the first eye and the first non-contact capacitance sensor at a second time;
determine a first temporal differential capacitance between the first capacitance and the third capacitance;
determine a fourth capacitance associated with the second eye and the second non-contact capacitance sensor at the second time;
determine a second temporal differential capacitance between the second capacitance and the fourth capacitance; and
determine eye gaze information based at least in part on the first spatial differential capacitance, the first temporal differential capacitance, and the second temporal differential capacitance.

8. The input device of claim 7, wherein the eye gaze information is determined if the first spatial differential capacitance is greater than a first threshold.

9. The input device of claim 7, wherein the eye gaze information indicates an eye gaze in a direction along an axis determined by a position of the first non-contact capacitance sensor and the second non-contact capacitance sensor.

10. The input device of claim 7, wherein the controller is further configured to:
compare the first temporal differential capacitance to a second threshold; and
compare the second temporal differential capacitance to a third threshold, wherein the eye gaze information indicates an eye gaze toward the first non-contact capacitance sensor if the first temporal differential capacitance is greater than the second threshold and the second temporal differential capacitance is less than the third threshold.

11. The input device of claim 10, wherein the eye gaze information indicates an eye gaze toward the second non-contact capacitance sensor if the first temporal differential capacitance is less than the second threshold and the second temporal differential capacitance is greater than the third threshold.

12. The input device of claim 7, wherein the controller is further configured to:

determine a second spatial differential capacitance between the third capacitance and the fourth capacitance; and
determine at least one from the group consisting of:
a maximum capacitance between the first spatial differential capacitance and the second spatial differential capacitance,
a minimum capacitance between the first spatial differential capacitance and the second spatial differential capacitance; and
an average capacitance between the first spatial differential capacitance and the second spatial differential capacitance,
wherein the eye gaze information is based at least in part on at least one from the group consisting of the maximum, minimum, and average capacitance.

13. An electronic system, comprising
a display device; and
an input device comprising:
a first non-contact capacitance sensor;
a second non-contact capacitance sensor;
a sensor interface circuit coupled to the first non-contact capacitance sensor and the second non-contact capacitance sensor and configured to determine capacitance values based on signals from the first non-contact capacitance sensor and the second non-contact capacitance sensor; and
a controller coupled to the sensor interface circuit and configured to:
determine a first capacitance associated with a first eye and the first non-contact capacitance sensor at a first time;
determine a second capacitance associated with a second eye and the first non-contact capacitance sensor at the first time;
determine a first spatial differential capacitance between the first capacitance and the second capacitance;
determine a third capacitance associated with the first eye and the first non-contact capacitance sensor at a second time;
determine a first temporal differential capacitance between the first capacitance and the third capacitance;
determine a fourth capacitance associated with the second eye and the second non-contact capacitance sensor at the second time;
determine a second temporal differential capacitance between the second capacitance and the fourth capacitance; and
determine eye gaze information based at least in part on the first spatial differential capacitance, the first temporal differential capacitance, and the second temporal differential capacitance.

14. The electronic system of claim 13, wherein the eye gaze information indicates an eye gaze in a direction along an axis determined by a position of the first non-contact capacitance sensor and the second non-contact capacitance sensor.

15. The electronic system of claim 13, wherein the controller is further configured to:
compare the first temporal differential capacitance to a first threshold; and
compare the second temporal differential capacitance to a second threshold, wherein the eye gaze information indicates an eye gaze toward the first non-contact capacitance sensor if the first temporal differential capacitance is greater than the first threshold and the second temporal differential capacitance is less than the second threshold.

16. The electronic system of claim 15, wherein the eye gaze information indicates an eye gaze toward the second non-contact capacitance sensor if the first temporal differential capacitance is less than the first threshold and the second temporal differential capacitance is greater than the second threshold.

17. The electronic system of claim 13, wherein the controller is further configured to:
  determine a second spatial differential capacitance between the third capacitance and the fourth capacitance; and
  determine at least one from the group consisting of:
    a maximum capacitance between the first spatial differential capacitance and the second spatial differential capacitance,
    a minimum capacitance between the first spatial differential capacitance and the second spatial differential capacitance; and
    an average capacitance between the first spatial differential capacitance and the second spatial differential capacitance,
  wherein the eye gaze information is based at least in part on at least one from the group consisting of the maximum, minimum, and average capacitance.

* * * * *